United States Patent [19]

Fanqing et al.

[11] Patent Number: 4,851,136

[45] Date of Patent: Jul. 25, 1989

[54] METHOD OF AND APPARATUS FOR FILTERING A MEDIUM

[75] Inventors: Liu Fanqing; Li Junwen; Yao Jixian, all of Jilin, China

[73] Assignee: Dongbei Power College, Jilin, China

[21] Appl. No.: 146,837

[22] Filed: Jan. 22, 1988

[30] Foreign Application Priority Data

Jan. 27, 1987 [CN] China .................................. 87100467

[51] Int. Cl.⁴ ............................................ B01D 29/08
[52] U.S. Cl. .................................... 210/798; 210/350; 210/411
[58] Field of Search ............... 210/350, 483, 411, 446, 210/497.01, 798

[56] References Cited

U.S. PATENT DOCUMENTS 3,180,825 4/1965 Couvreur et al. ............... 210/350 X
4,219,420 8/1980 Muller .............................. 210/411 X Primary Examiner—Frank Spear
Attorney, Agent, or Firm—Kenyon & Kenyon

[57] ABSTRACT

The invention relates to a method of and an apparatus for filtering a medium. The apparatus has a filter housing and a supporting means located within the filter housing. A plurality of fiber bundles are attached to the supporting means and extend within the filter housing in direction between an inlet and an outlet. A flexible waterproof membrane is provided within the filter housing to constitute a pressure chamber. When pressurized during the filtration process, the membrane presses the plurality of fiber bundles to form a frustrum-like filter chamber. The medium becomes filtered as it passes through the frustum-like filter chamber.

14 Claims, 4 Drawing Sheets

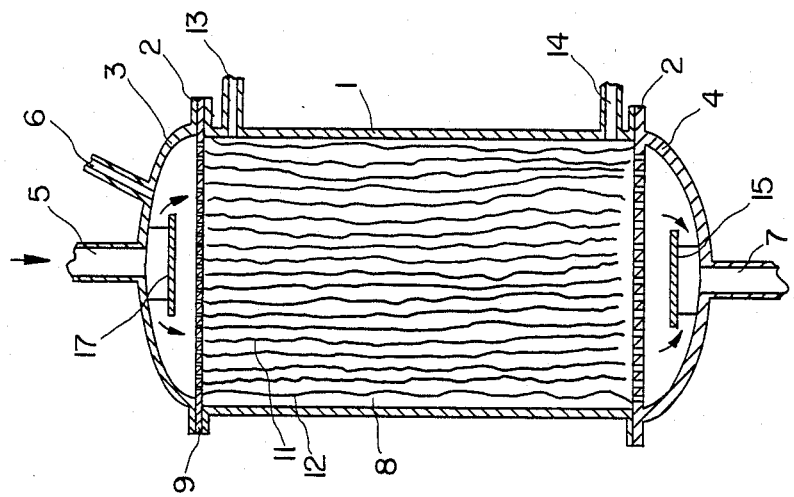
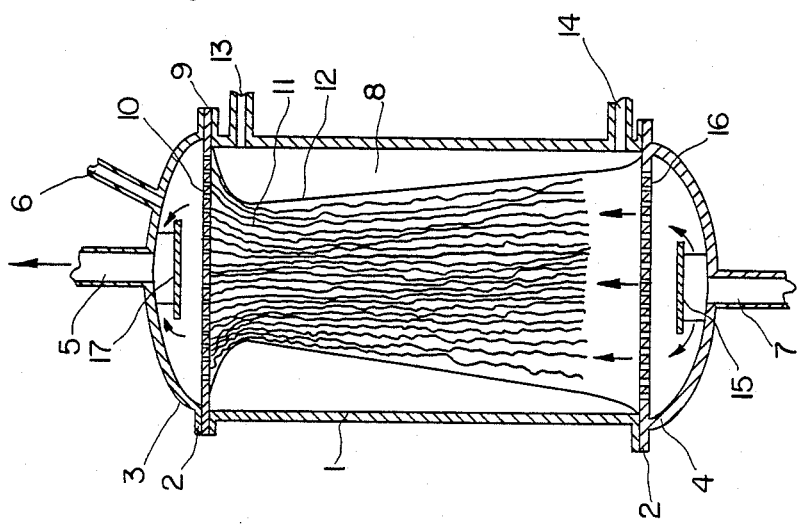

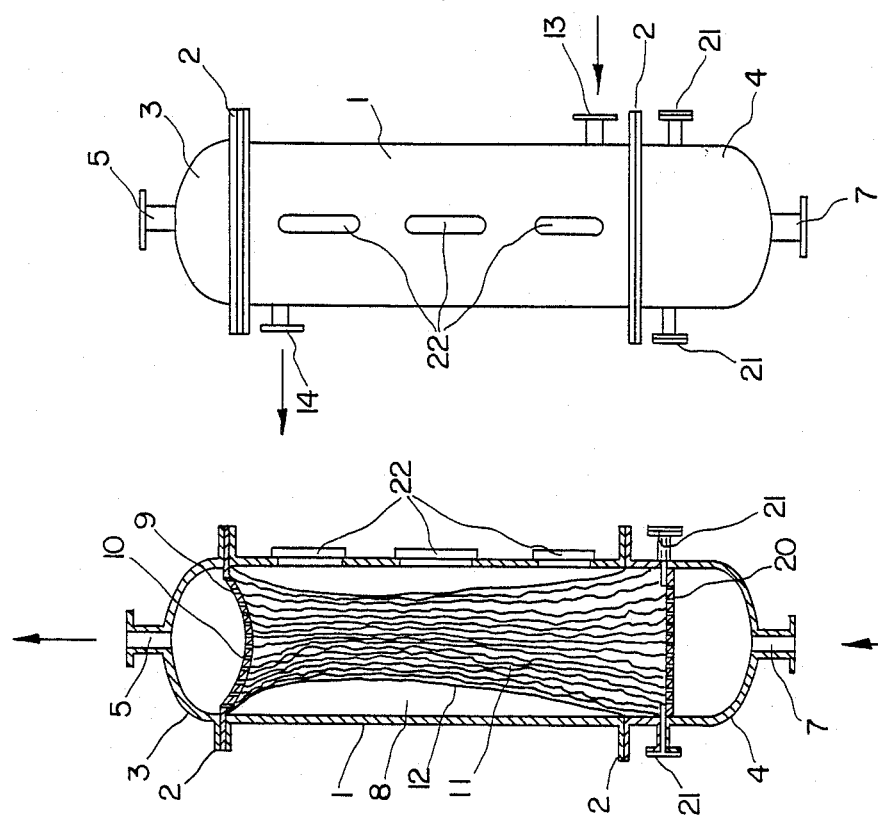

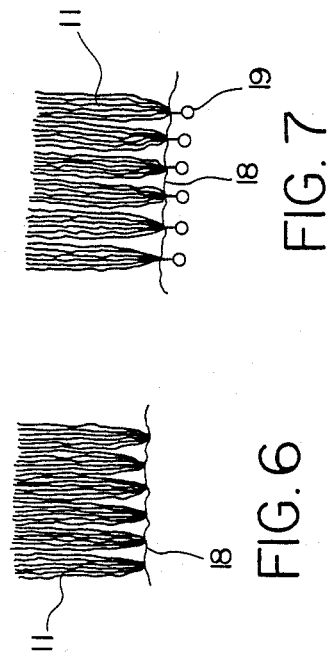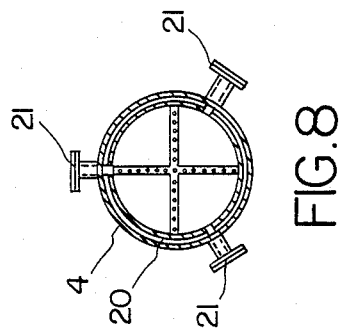

METHOD OF AND APPARATUS FOR FILTERING A MEDIUM

BACKGROUND OF THE INVENTION

This invention relates to a method of and an apparatus for filtering a medium, particularly to an improvement in methods and apparatus for filtering a medium with a brush filter.

U.S. Pat. No. 4219,420, discloses an arrangement for and a process of filtering a contaminated medium. According to the patent, a plurality of fiber bundles are located on a support and extend within a filter housing in direction between an inlet and an outlet of the housing. The contaminated medium is introduced into the housing through the inlet in a direction towards the outlet. The contaminated particles are arrested by the fibers as they pass through the plurality of fiber bundles. In order to improve the "depth effect" of the fiber bundles, the fibers may have different lengths. The quality of the filtered medium depends on the density of the fiber bundles.

One of the disadvantages of the process and arrangement is that the density of the fiber bundles in the filtration process is the same as in the back-flushing process. In order to enhance the quality of the filtered medium, the density of the fibers must be increased, whereas the increase thereof within the arrangement will reduce the capacity of the arrangement to arrest contaminated particles and make the back-flushing process more difficult. For the process and the arrangement, therefore, the ability to enhance the quality of the filtered medium is limited and the flow speed of the contaminated medium in the arrangement is slow.

SUMMARY OF THE INVENTION

The object of the present invention is to provide a method of filtering a medium and an apparatus therefor which increase the capacity of catching contaminated particles, enhance the quality of the filtered medium, increase the speed of the filtering, and make the back-flushing much easier. By using the present invention, the following objects may be accomplished simultaneously increasing the capacity of catching contaminated particles; enhancing the quality of the filtered medium; and making the back-flushing process easy.

The present invention employs a filter which comprises a filter housing having an inlet and an outlet, a supporting means located within the filter housing and close to the outlet and, a plurality of fiber bundles located within the filter housing and extending along the length of the filter housing in the direction of the medium flow from the inlet towards the outlet, each of the plurality of fiber bundles having a first end and a second end, the first end of each of the plurality of fiber bundles being attached to the supporting means. The filter also comprises means for preventing the second end of each of the plurality of fiber bundles from getting tangled with each other and from becoming compressed against the supporting means during the filtration process. The filter further comprises at least one flexible waterproof membrane which is located between the wall of the filter housing and the plurality of fiber bundles and thus forms a pressure chamber together with the wall of the filter housing which is called "outer-membrane type", the pressure chamber having a pressurizing aperture and a release aperture.

The wall of the filter housing may be of soft structure. The filter may be either of sealed-pressure type or of open-weight type. For a large filter, a method of multiple-stage filtering may be adopted, by which a medium is filtered stage by stage. The filter may also be operated when the pressurizing aperture and the release aperture are open to the atmosphere, whereas the pressure within the filter is made below the atmosphere. In this case, the wall of the filter housing may be omitted.

The said membrane is of cylindrical shape, longer than the length of the filter housing and having a projecting portion on each of the two ends thereof. The filter has a first cap and a second cap, each mounted on one end of the filter housing. The projecting portions of the membrane are attached to the contact surfaces between the filter housing and the first and second caps respectively. The flexible membrane may be made of one of the following materials: polyvinylchloride, rubberized fabric, polyester fiber, and rubber cloth.

To prevent the second ends of the fibers from tangling with each other, the second ends of fibers are tied together in a number of separate bundles. The bundles are connected together by fibers to form a network.

To prevent the medium to be filtered from compressing the plurality of fiber bundles against the supporting means during the filtration process, the network may be weighted. Alternatively, at least one ring may be attached to the network and at least three limit means may be mounted on the second cap, the limit means extending into the filter housing preventing the ring from moving in the direction of the medium flow.

The fibers used in the filter may be long fibers of various materials, or strips or belts made of long or short fibers. The surface of the fibers may be smooth or rough (e.g., screw shaped).

To increase the density of fibers within the filter housing, the supporting means may be a multiple aperture curved plate, e.g., a multiple aperture special plate. The curved plate has a first set of apertures and a second set of apertures. The first ends of the plurality of fiber bundles are attached to the first set of apertures and the medium flow passes through the second set of apertures during the filtration process. The first ends of the plurality of fiber bundles may be fixed in the first set of apertures by being squeezed thereinto, or by being tied by fibers thereto.

Another embodiment of the present invention is that the pressing membrane is mounted among the plurality of fiber bundles within the filter housing. A pipe is located within the membrane along the length of the filter housing. The lower end of the pipe is sealed and the upper end thereof extends out of the filter housing, and is provided with a valve. The pipe has a plurality of apertures. Thus, the space between the membrane and the pipe constitutes a pressure chamber, which is called "inner-membrane type".

Alternatively, there may be more than one membrane located within the filter housing. The membranes may be of the same type or may be of a combination of outer-membrane type and inner-membrane type, the forms of which should, based on the present invention, be obvious to a person skilled in the art.

One advantage of the present invention is that with the help of the flexible waterproof membrane, the extent of the pressure of the membrane on the plurality of fiber bundles can be changed at will by adjusting the volume of pressurized water or gas in the membrane. Another advantage of the present invention is that, because of the loss of pressure of the medium when the medium passes through the plurality of fiber bundles during the filtration process, the difference between the pressure within the membrane and the pressure outside the membrane increases along the length of the filter housing in the direction of the medium flow from the inlet towards the outlet, whereas the volume of the pressure chamber remains unchanged. A frustum-like filter chamber is therefore formed, the diameter of which become smaller along the length of the filter housing from the inlet towards the outlet. Therefore, during the filtration process, the spaces among the plurality of fiber bundles are different along the length of the filter housing, becoming smaller from the inlet towards the outlet. Thus, the "depth effect" of the fiber bundles and, then, the quality of the filtered medium are improved, and the capacity of catching contaminated particles is also enhanced. During the back-flushing process, the pressure in the membrane is released, and the frustum-like filter chamber therefore disappears, which makes the back-flushing very easy. In order to improve the effect of the back-flushing, compressed air may be used as the cleaning medium during the process, as is known in the prior art. The filter may also be used with the inlet higher than the outlet, whereas the weight is replaced by a plurality of floats. In such case, using compressed air as the cleaning medium during the back-flushing process is more convenient. In addition, a method of high-speed particle flushing may be adopted in the back-flushing process. E.g. an apparatus for flushing the filter surface, which is known in the prior art, may be used, wherein the position of the spray nozzle is changed to be adjusted vertically and the nozzle is of rotatory type or of translational type to flush the plurality of fiber bundles from the side of the supporting means.

The present invention enhances the quality of the filtered medium, increases the capacity of catching the contaminated particles and the filtering speed, and makes the back-flushing easy. Tests have shown that, by using the present invention, a medium can be obtained with a filtered quality higher exceeding present expectations. According to the present invention, all suspended substances and colloidal substances in water, including colloidal iron, organic compounds, and virus, can be filtered during the filtration process. A filter according to the present invention can not only filter suspended substances in water, but also can filter ions that are dissolved in water or other liquids or gases, provided the appropriate fibers are used. Therefore, compared to the known methods and filters, the present invention provides a new method and filter which can efficiently filter mediums such as contaminated water and produce a high quality filtered medium.

The present invention can be best understood from the following description of specific embodiments with reference to the accompanying drawings.

BRIEF DESCRIPTION OF THE DRAWINGS

FIG. 1 is a longitudinal sectional view of an outer-membrane type filter during the filtration process in accordance with the present invention;

FIG. 2 is a longitudinal sectional view of the filter as shown in FIG. 1 during the back-flushing process in accordance with the present invention;

FIG. 3 is a longitudinal sectional view of an outer-membrane type filter having fiber bundles attached with a ring retained by limit means during the filtration process in accordance with the present invention;

FIG. 4 is the perspective view of the filter as shown in FIG. 3;

FIG. 6 is a schematic view of a network connecting the first ends of a plurality of fiber bundles;

FIG. 7 is a schematic view of a weighted network;

FIG. 8 is a schematic view of the interrelation between a ring and a limit means.

DETAILED DESCRIPTION OF THE PREFERRED EMBODIMENTS

Figure 5:
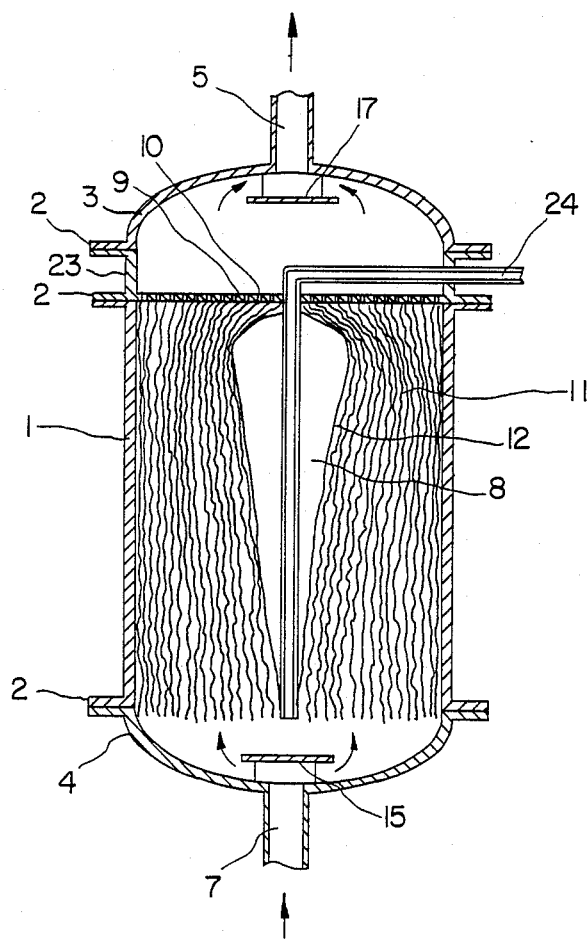
FIG. 5 is a longitudinal sectional view of an inner-membrane type filter during the filtration process in accordance with the present invention.

Referring to FIG. 1 and FIG. 2, the first embodiment of the filter according to the present invention comprises a filter housing, an upper cap 3, a lower cap 4, a plurality of fiber bundles 11 and a flexible waterproof membrane 12. The caps 3 and 4 and the filter housing 1 are connected together by the flange 2. The upper part of the upper cap 3 has a water outlet 5 and an air release aperture 6. The lower part of the lower cap 4 has a water inlet 7 which is, through a three-way valve, connected to the source of the water to be filtered and to a contaminated particle release outlet, respectively. The outlet 5, the release aperture 6, and the inlet 7 are each provided with a valve. A multiple aperture plate is attached to the flange connecting the upper cap and the filter housing. The plate has a first set of apertures and a second set of apertures. The first ends of the plurality of the fiber bundles 11 are attached to the first set of apertures, whereas the filtered medium passes through the second set of apertures.

To prevent the fiber bundles from getting tangled with each other, the other ends of the plurality of fiber bundles may be connected together by fibers to form a network (see FIG. 6) which is weighted by the weights 19 (see FIG. 7). Alternatively, these ends of the plurality of fiber bundles may be, as is known in the prior art, weighted without being connected together to form a network. In this case, measures should be adopted to prevent the fiber bundles from getting tangled with each other and getting out of the direct way of the water flow, e.g., the diameter of the weights may be properly selected to enable the weights to come in contact with each other, or support rings may be attached to the weights. Rings may be used as weights themselves. Several fiber bundles may be attached to a ring, and the rings may come in contact with each other or the rings may be different sizes so that the smaller rings are arranged within the larger ones. A cylindrically shaped two-layer membrane 12 of polyvinyl chloride is arranged within the filter housing enclosing the plurality of fiber bundles to form a pressure chamber. The diameter of the membrane is equal to the inner diameter of the filter housing. The membrane is longer than the filter housing. Each of the two ends of the membrane is attached to the respective flange. A pressurizing aperture and a release aperture for water or air, each having its respective valve installed therewith, are provided on the wall of the filter housing.

During the filtration process, the following steps are to be adopted: closing the release aperture; opening the outlet 5 and the air release aperture 6; opening a pressurizing aperture 13 to pressurize the pressure chamber to make the membrane 13 press the plurality of fiber bundles up to a certain degree; maintaining the pressure in the pressure chamber; closing the pressurizing aperture; and opening the water inlet 7. Because the water loses its pressure when passing through the plurality of fiber bundles, the fiber bundles form a frustum-like filter chamber (see FIG. 1). The spaces among the fiber bundles are thus different along the length of the filter housing becoming smaller towards the outlet. Therefore, the "depth effect" of the fiber bundles to filter water is improved. When water is filled in the filter housing, the air release aperture 6 is closed. The filtered water passes through the water outlet 5.

In order to improve the distribution of water to be filtered in the filter housing, a plate 15 is mounted facing the water introduced from the water inlet 7, and a multiple aperture plate 16 is mounted on the lower cap flange to introduce water into the filter housing through the apertures thereon. Another plate 17 is provided in front of the water outlet 5.

During the back-flushing process the following steps are to be adopted: opening the release aperture; closing the water outlet; squeezing out the water or air within the pressure chamber; closing the water inlet; opening the water outlet to introduce clean water into the filter housing; opening the contaminated particle release outlet to discharge the particles caught during the filtration process. The back-flushing process takes very little time. An observation window may be provided on the wall of the filter housing for the purpose of observing the processes.

Referring to FIG. 3 and FIG. 4, the second embodiment of the filter, according to the present invention, comprises a filter housing 1, an upper cap 3, a lower cap 4, a plurality of fiber bundles 11, and a flexible waterproof membrane 12. The caps 3 and 4 and the filter housing 1 are connected together by the flanges 2. The upper part of the upper cap 3 has a water outlet 5 and an air release aperture. The lower part of the lower cap 4 has a water inlet 7 which is connected to the source of water to be filtered and to a contaminated particle release outlet through a three-way valve. A multiple aperture curved plate 9 is attached to the flange connecting the upper cap and the filter housing. The curved plate has a first set of apertures and a second set of apertures. The first ends of the plurality of the fiber bundles 11 are attached to the first set of apertures, whereas the filtered medium passes through the second set of apertures. The other ends of the plurality of fiber bundles are connected together by fibers to form a network 18 (see FIG. 6) which is weighted by a ring 20. The ring is located below the flange connecting the lower cap and the filter housing. Three limit screws 21 mounted on the lower cap along the circumference thereof extend into the filter housing to stop the ring from moving in the direction of the medium flow (see FIG. 8). The flexible waterproof membrane 12 forming a pressure chamber is arranged within the filter housing enclosing the plurality of fiber bundles. The membrane is made of polyester fiber, the length of which is 60 mm longer than that of the filter housing. A pressurizing aperture 13 and a release aperture 14 are provided on the wall of the filter housing.

During the filtration process, the pressure chamber is pressurized through the pressurizing aperture 13 to make the membrane 12 press the plurality of the fiber bundles 11. Since the water loses its pressure when passing through the plurality of fiber bundles, the fiber bundles form a frustum-like filter chamber. The spaces among the fiber bundles are thus different along the length of the filter housing, becoming smaller towards the outlet. Therefore, the "depth effect" of the fiber bundles to filter water is improved. Because of the adoption of the ring and limit screws, the flow speed of water can be increased without getting the fiber bundles tangled with each other. To improve the distribution of water, plates may be mounted close to the inlet and the outlet, respectively. A plurality of observation windows 22 may be provided on the wall of the filter housing. The back-flushing process of the embodiment is similar to that of the first embodiment of the present invention.

Referring to FIG. 5, the third embodiment of the filter according to the present invention comprises a filter housing 1, an upper cap 3, a lower cap 4, a connecting means 23, a plurality of fiber bundles 11, and a flexible waterproof membrane 12. The filter housing, the caps 3 and 4, and the connecting means 23 are connected together by the flanges 2. The connecting means 23 comprises a multiple aperture plate 9, and a pipe 24 which passes through the multiple aperture plate 9 and then turns 90° extending out of the connecting means. The lower end of the pipe 4 is sealed. A plurality of apertures are provided on the pipe wall below the multiple aperture plate 9. The membrane 12 is attached to and encloses the part of pipe 24 below the multiple aperture plate 9 to form a pressure chamber. The membrane is made of rubberized fabric and is of cylindrical shape, the diameter of which is such that when the membrane is fully pressurized, it can press the plurality of fiber bundles to the extend that no spaces are left among the fiber bundles. The surface of each of the fibers is screw shaped. The multiple aperture plate 9 has a first set of apertures and a second set of apertures. The first ends of the fiber bundles are attached to the first set of apertures and the filtered medium passes through the second set of apertures. The other ends of the fiber bundles are set free or connected together to form a network. To improve the distribution of the medium, plates 15 and 17 are provided close to an outlet 5 and an inlet 7, respectively.

During the filtration process, pressurized water or air is introduced into the pressure chamber through the pipe 24 to make the membrane 12 press the plurality of fiber bundles 11. The medium to be filtered is introduced into the filter through the inlet 7. Since the medium loses its pressure when passing through the plurality of fiber bundles, the fiber bundles form a frustum-like filter chamber. The spaces among the filter bundles are thus different along the length of the filter housing, becoming smaller towards the outlet. Therefore, the "depth effect" of the fiber bundles to filter the medium is improved. During the back-flushing process, the pressurized water or air in the pressure chamber is first released. The process is similar to that of the first embodiment of the present invention.

We claim:

1. A method for filtering a medium in a filter, wherein the filter comprises a filter housing having an inlet and an outlet, a plurality of fiber bundles located within the filter housing and extending along the length of the filter housing in the direction of the medium flow from the inlet towards the outlet, and at least one flexible waterproof membrane and a pressure chamber formed thereby, comprising:
   (a) pressurizing the pressure chamber to make the flexible waterproof membrane press the plurality of fiber bundles;
   (b) maintaining the pressure in the pressure chamber;

(c) introducing the medium into the filter through the inlet for filtering, the spaces among the plurality of fiber bundles along the length thereof becoming smaller towards the outlet so as to form a frustum-like filter chamber; and (d) withdrawing the filtered medium form the filter housing through the outlet.

2. The method of claim 1, comprising adjusting the pressure in the pressure chamber to control the extent to which the plurality of fiber bundles are pressed thereby.

3. The method of claim 1, comprising:
releasing the pressure in the pressure chamber;
closing the inlet; and
flushing the plurality of fiber bundles in the filter to discharge particles caught during the filtration process out through a particle release outlet.

4. An apparatus for filtering a medium comprising:
(a) a filter housing having an inlet and an outlet;
(b) a supporting means located within the filter housing and close to the outlet;
(c) a plurality of fiber bundles located within the filter housing and extending along the length of the filter housing in the direction of the medium flow from the inlet towards the outlet, each of the plurality of fiber bundles having a first end and a second end, the first end of each of the plurality of fiber bundles being attached to the supporting means;
(d) means for preventing the second end of each of the plurality of fiber bundles from getting tangled with each other and from moving in the direction of the medium flow during a filtration process; and
(e) at least one flexible waterproof membrane located within the filter housing and forming a pressure chamber, the pressure chamber having a pressurizing aperture and a release aperture and pressing the plurality of fiber bundles when pressurized during the filtration process.

5. The apparatus of claim 4 comprising an adjusting means to adjust the pressure in the pressure chamber to control the extent to which the plurality of fiber bundles are pressed thereby.

6. The apparatus of claim 4, wherein the flexible waterproof membrane is mounted between the wall of the filter housing and the plurality of fiber bundles.

7. The apparatus of claim 4, wherein the flexible waterproof membrane is mounted among the plurality of fiber bundles.

8. The apparatus of claim 4, wherein all of the second ends of each of the plurality of fiber bundles are connected together by fibers to form a network.

9. The apparatus of claim 8, wherein the network is weighted.

10. The apparatus of claim 8, wherein the network is connected to a plurality of floats.

11. The apparatus of claim 8, comprising
a first cap and a second cap being mounted on the two ends of the filter housing respectively, the second end of each of the plurality of fiber bundles being arranged close to the second cap;
at least one ring being attached to the network; and
a plurality of limit means being mounted on the second cap and extruding into the filter housing to prevent the ring from moving in the direction of the medium flow.

12. The apparatus of claim 4, wherein the supporting means is a multiple aperture plate, the plate having a first set of apertures and a second set of apertures, the first end of each of the plurality of fiber bundles being attached to each of the first set of apertures, the filtered medium passing through the second set of apertures during the filtration process.

13. The apparatus of claim 12, wherein the multiple aperture plate is a multiple aperture curved plate.

14. The apparatus of claim 4, wherein the flexible waterproof membrane is selected from the group consisting of polyvinyl chloride, rubberized fabric, polyester fiber, and rubber cloth.

* * * * *